United States Patent [19]

Fox

[11] Patent Number: 6,108,272
[45] Date of Patent: Aug. 22, 2000

[54] METHOD AND APPARATUS FOR LOCATING DIVER(S) FROM A SURFACE STATION AND ALERTING THE SURFACE STATION OF A DIVER EMERGENCY

[76] Inventor: Peter M. Fox, 959 E. Caribbean Dr., Summerland Key, Fla. 33042

[21] Appl. No.: 09/190,413

[22] Filed: Nov. 6, 1998

[51] Int. Cl.$^7$ .................................................. H04B 11/00
[52] U.S. Cl. ................................ 367/131; 134/6; 134/127
[58] Field of Search ................................ 367/131, 6, 127, 367/134

[56] References Cited

U.S. PATENT DOCUMENTS 5,185,725  2/1993  Kent et al. ................................... 367/6
5,784,339  7/1998  Woodsum et al. ....................... 367/134

*Primary Examiner*—Daniel T. Pihulic

[57] ABSTRACT

A system and method for determining the geographic relationship between a surface station and at least one diver, including a first and second devices for sending passive or active select signal frequencies and receiving select signal response frequencies data. A third and fourth devices for receiving passive or active select signal frequencies data and sending passive or active select signal response frequencies to the first device. A fifth and sixth device for processing data based on a cycle time and a seventh and eighth device for plotting the data received from the fifth and sixth devices. The fifth and sixth devices includes a memory containing data structure for storing information relating to determining the geographic relationship between the first and second devices based on direction and cycle time, including fields which store select signal frequencies and select response signal frequencies, fields which store cycle data to determine distance and direction relationship data, and fields which store recall or alarm mode activation. A computer program product includes a computer storage medium having a computer program code mechanism embedded in the computer storage medium for causing a computer to initiate a mechanical alarm should the system be activated in the active recall or alarm modes. A computer program product includes a computer storage medium having a computer program code mechanism embedded in the computer storage medium including a code device for plotting and transmitting the data to the seventh and eighth devices.

21 Claims, 12 Drawing Sheets

METHOD AND APPARATUS FOR LOCATING DIVER(S) FROM A SURFACE STATION AND ALERTING THE SURFACE STATION OF A DIVER EMERGENCY

BACKGROUND OF THE INVENTION

1. Field of the Invention

This invention relates to a system to determine a geographical relationship between at least one diver and a surface station and to allow the surface station to emit a recall signal or for a diver to emit an emergency signal.

2. Discussion of Background

In recent years, systems have been developed for signaling the divers that a dive is over. In one such system, referred to as a "Recall System", is for the personnel operating a surface station to submerse a horn or other audible device beneath the surface of the water and send a signal for the diver(s) who have been briefed on what to listen for. The diver(s) then surface, get a fix on the surface station's location with a compass, and then re submerge and travel in the direction of the surface station. Another system, referred to as a "Drift System", which is commonly used on drift dives incorporates the use of a surface float connected to a dive leader. The surface float gives a visual reference of the dive leader to the surface station team allowing them to follow the progress of the dive and be available for recovery upon completion of the dive.

Another system, referred to as a "Night Dive System", has been developed for night diving or diving with zero visibility. This system utilizes a series of lights, both on the diver(s) and on the anchor line or set up at the surface station to aid the diver(s) in relocating the surface station at the end of the dive.

Also see U.S. Pat. No. 3,045,206, U.S. Pat. No. 3,541,717, U.S. Pat. No. 5,079,753, and U.S. Pat. No. 5,148,412 for additional teachings.

However, the above, as well as other systems, require a high level of vigilance on the part of the individual diver(s) and the surface station personnel as well as reliance on visual orientation by either or both.

With respect to the commonly used recall system, it is imperative that diver(s) first hear the signal, which may be combined or interfaced with by other underwater background noise. The diver(s) then surface to get a visual fix on the surface station utilizing a compass and dead reckoning to determine distance, and then re submerge again and travel in that fixed direction for the approximate distance. Accordingly, this system requires additional effort on the part of the diver(s) and human error is introduced into the system for returning the diver(s) directly to the surface station.

With respect to the commonly used drift diving system, the system requires that at least one diver be encumbered by controlling the surface float which gives the surface station a visual fix on the approximate location of the dive group. Accordingly, while this may be adequate for following the group, if an individual diver is separated from the group he must surface, attempt to locate the surface station, alert them by some means that he has been separated and wait for pickup. This often means that the surface station must keep visual contact of both the surfaced diver and dive group or leave the surface station's position for the required pickup and then reestablish the surface marker denoting the location of the group. Unfortunately, under severe weather conditions this type of visual reference can be hazardous if not impossible to adhere to.

With respect to the commonly used night diving or zero visibility system, the system relies on lights or marker lines to orient a diver to their location relative to the surface station. Accordingly, this often means that the diver(s) are limited to the distance that they can travel from the surface station due to length of marker line or visibility for keeping track of the lighted markers. In the case of marker lights it is further complicated if the surface station is a point of entry or exit off a shore reference which will require the diver(s) to become reoriented for termination of the dive.

However in all of the current systems available it is not typical for the diver(s) to signal the surface station of an emergency situation (i.e., out of air, entangled at depth, in danger of decompression sickness, swept off location by current, etc.). Accordingly, a diver must signal to his dive buddy and/or surface, signal the surface station of distress and hope that the surface station personnel will notice and locate him and then act accordingly. Unfortunately, at present, the common doctrine is to stay on station with the group until recovered and then aid the distressed diver(s).

SUMMARY OF INVENTION

Accordingly, one object of this invention is to provide a novel system and method for alerting and recalling at least one diver upon completion of the dive, wherein there is a mechanical signal, and the distance, and direction of the surface station are transmitted to the diver(s) without the need for the diver(s) to surface, orient himself, and re submerge to travel back to the surface station.

Another object of this invention is to provide a novel system and method for determining the geographical relationship between the surface station and the submerged diver(s) from either the perspective of the surface station or the individual diver(s).

Another object of this invention is to provide a novel system and method for maintaining and updating the geographic relationship between the surface station and the submerged diver(s) as the dive progresses.

Another object of the present invention is to provide a system and method for maintaining critical data regarding location of the surface station during conditions which are less than optimal such as night diving and/or diving with zero visibility without the need for complicated light systems or marker lines.

Another object of the present invention is to provide a novel method and system for maintaining critical data regarding location of the surface station and/or at least one submerged diver during a drift dive without encumbering the diver(s) with a surface float; allowing this diver to be more available to the dive group if required.

It is also an object of the present invention to provide a novel system and method for aiding the night shore diver(s) in relocating the area of intended exit at the conclusion of the dive without the need to surface, perform dead reckoning direction and distance calculations, and then re submerge for the travel back to the approximate location desired.

It is yet another object of the preset invention to provide a novel method and system to alert the surface station personnel of an emergency situation with respect to an individual diver without relying on the passive vigilance of the surface personnel.

It is noted that one objective of the present invention is to establish a basic method and system of communication between the surface station personnel and the submerged diver(s); an option to this objective would be to further enhance the level of communication utilizing preprogrammed coded pulses to describe more accurately the nature of an emergency and/or observation by either the surface personnel or at least one submerged diver.

The above and other objectives are achieved according to the present invention by providing a new and improved method for determining the geographic relationship between the surface station and at least one submerged diver by initiating and transmitting passive or active select signal frequencies from at least one diver system to a surface station, receiving passive or active select signal frequencies from at least one diver at the surface station, recording the data collected and issuing the appropriate active or passive select response signal frequency and calculating the distance and direction to the diver system based on the cycle time and initiated direction, displaying the data collected at the surface station, transmitting the appropriate active or passive select response signal frequency from the surface station to at least one diver, receiving the active or passive select response signal frequency from the surface station at the diver(s), recording the data collected, initiating the next active or passive select signal frequency and calculating the distance and direction to the surface station based on the cycle time and initiated response direction, and displaying the data collected at the diver station.

According to a second aspect of the present invention there is provided a new and improved system for determining the geographic relationship between the surface station and at least one submerged diver, including a first device for initiating and transmitting passive or active select signal frequencies from at least one diver system to a surface station, a second devise for receiving passive or active select signal frequencies from at least one diver at the surface station, a third devise for recording the data collected and issuing the appropriate active or passive select response signal frequency and calculating the distance and direction to the diver system based on the cycle time and initiated direction, a fourth device for displaying the data collected at the surface station, a fifth device for transmitting the appropriate active or passive select response signal frequency from the surface station to at least one diver, a sixth device for receiving the active or passive select response signal frequency from the surface station at the diver(s), a seventh device for recording the data collected, initiating the next active or passive select signal frequency and calculating the distance and direction to the surface station based on the cycle time and initiated response direction, and an eighth device for displaying the data collected at the diver station.

According to a third aspect of the present invention, the third and seventh devices are a new and improved computer program product comprising a computer storage medium having a computer program mechanism embedded in the computer storage medium for causing a computer to determine the distance and direction relationship between the surface station and at least one diver based on the cycle time and direction of frequencies, the computer program code mechanism comprises, a first code device to receive select frequencies and/or respond with select response frequencies, a second code device to determine the distance/direction and depth relationship between the devices based on the cycle time of information, a third code device to initiate an alert or alarm mode and initiate the appropriate select signal frequency or select response signal frequency and initiate the corresponding alert o r alarm mode, a fourth code device to determine if the system is in the alert or alarm, a fifth code devise to monitor, display, and report on change in the relationship, and a sixth device to record time and duration of events.

BRIEF DESCRIPTION OF THE DRAWINGS

A more complete appreciation of the invention and many of the intendant advantages thereof will be readily obtained as the same becomes better understood by reference to the following detailed descriptions when considered in conjunction with the accompanying drawings, wherein.

DESCRIPTION OF THE PREFERRED EMBODIMENTS

Figure 1:
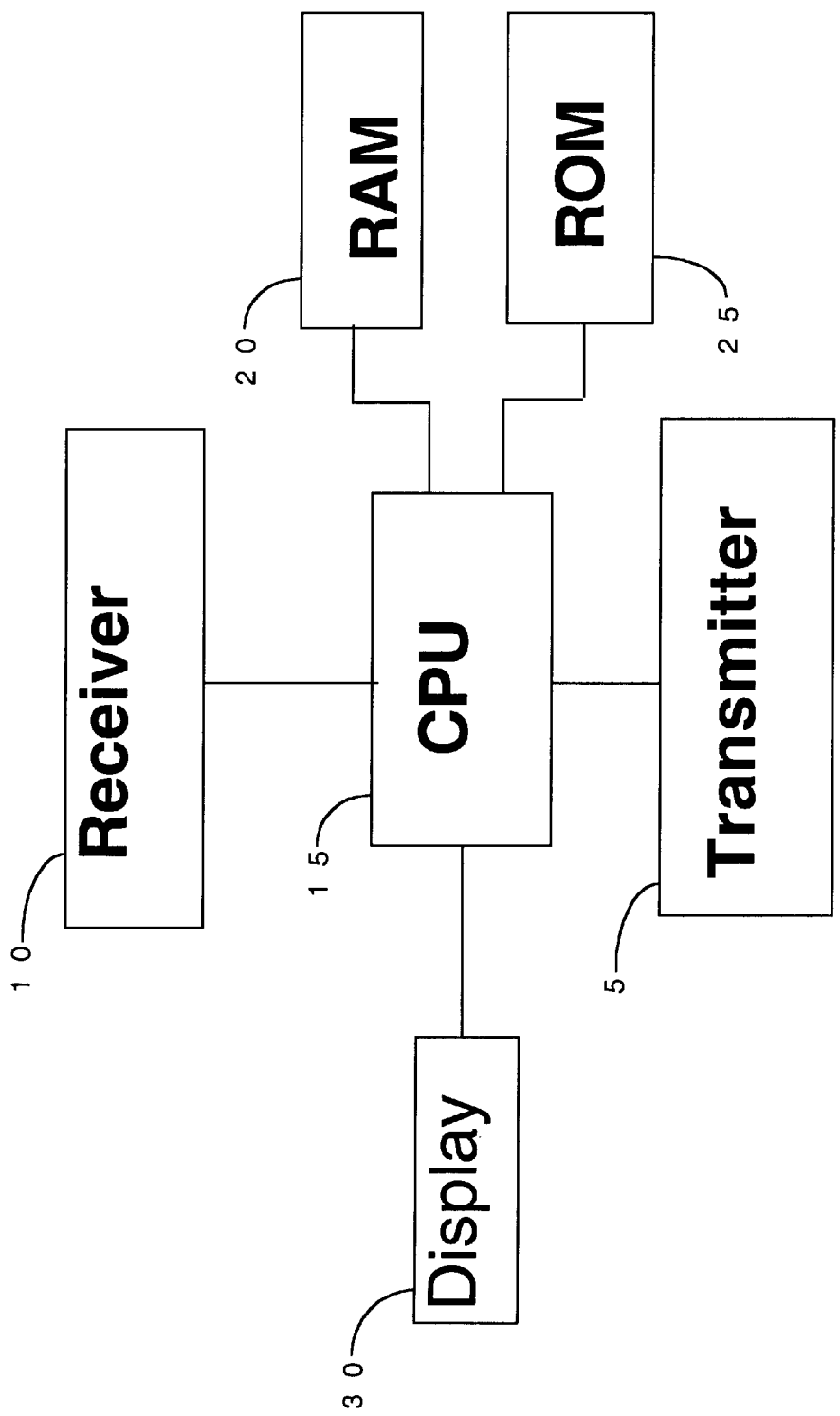
FIG. 1 illustrates the basic surface station portion of the system.

Referring now to the drawings, wherein like reference numerals designate identical on corresponding parts throughout the several views, and are particularly to FIG. 1 thereof there is illustrated a surface station portion of the system.

Referring to FIG. 1, a surface station system has been illustrated indicating a transmitter 5, receiver 10 a CPU (micro processing unit) 15, a RAM (random access memory unit) 20, a ROM (read only memory unit) 25, and a display unit 30 which processes information and interacts with the remote diver system.

Figure 2:
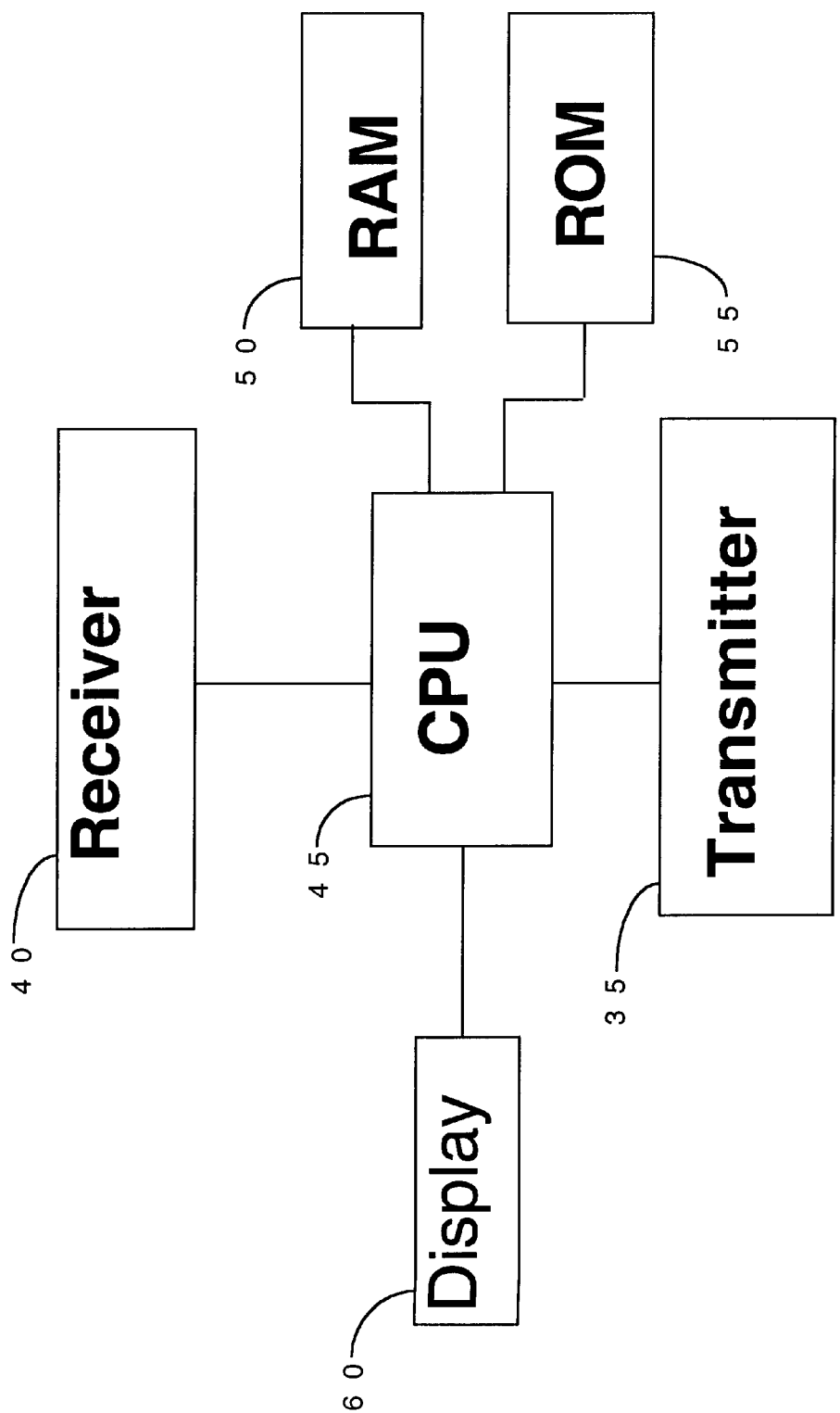
FIG. 2 illustrates the basic diver portion of the system.

Referring to FIG. 2, a remote diver system has been illustrated indicating a transmitter 35, receiver 40, a CPU (micro processing unit) 45, a RAM (random access memory unit) 50, a ROM (read only memory unit) 55, and a display unit 60 which processes information and interacts with the surface station system.

Figure 3:
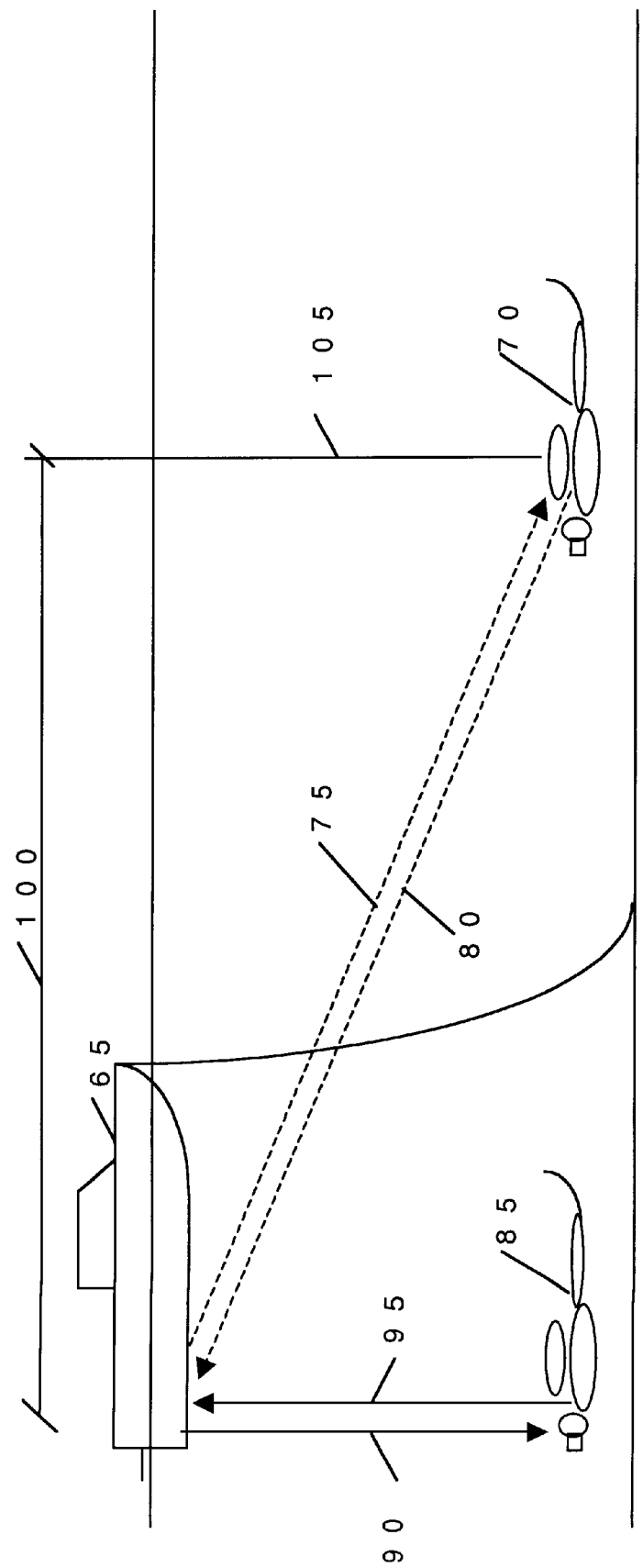
FIG. 3 illustrates how the system works in the passive.

Referring to FIG. 3, the remote diver systems 70 & 85 and surface station 65 are in the passive select frequency mode. Remote diver system 70 transmits a select frequency 80 to the surface station 65 which receives the data and automatically transmits a response select frequency 75 back to the remote diver system 70 completing the loop of information and causing the remote diver system 70 to begin the sequence over again. At a pre-selected interval, at least one other remote diver system 85, in the passive mode, transmits a different select frequency 95 to the surface station 65 which receives the data and automatically transits a different response select frequency 90 back to the remote diver system 85 completing the loop of information and causing the remote diver system 85 to begin the sequence again. The information data recorded through this sequence of events after two complete cycles allows both the surface station 65 and the remote diver system(s) 70 &85 to establish the distance/direction 100 and depth 105 relationship that exists between the transmitting and responding instruments.

Figure 4:
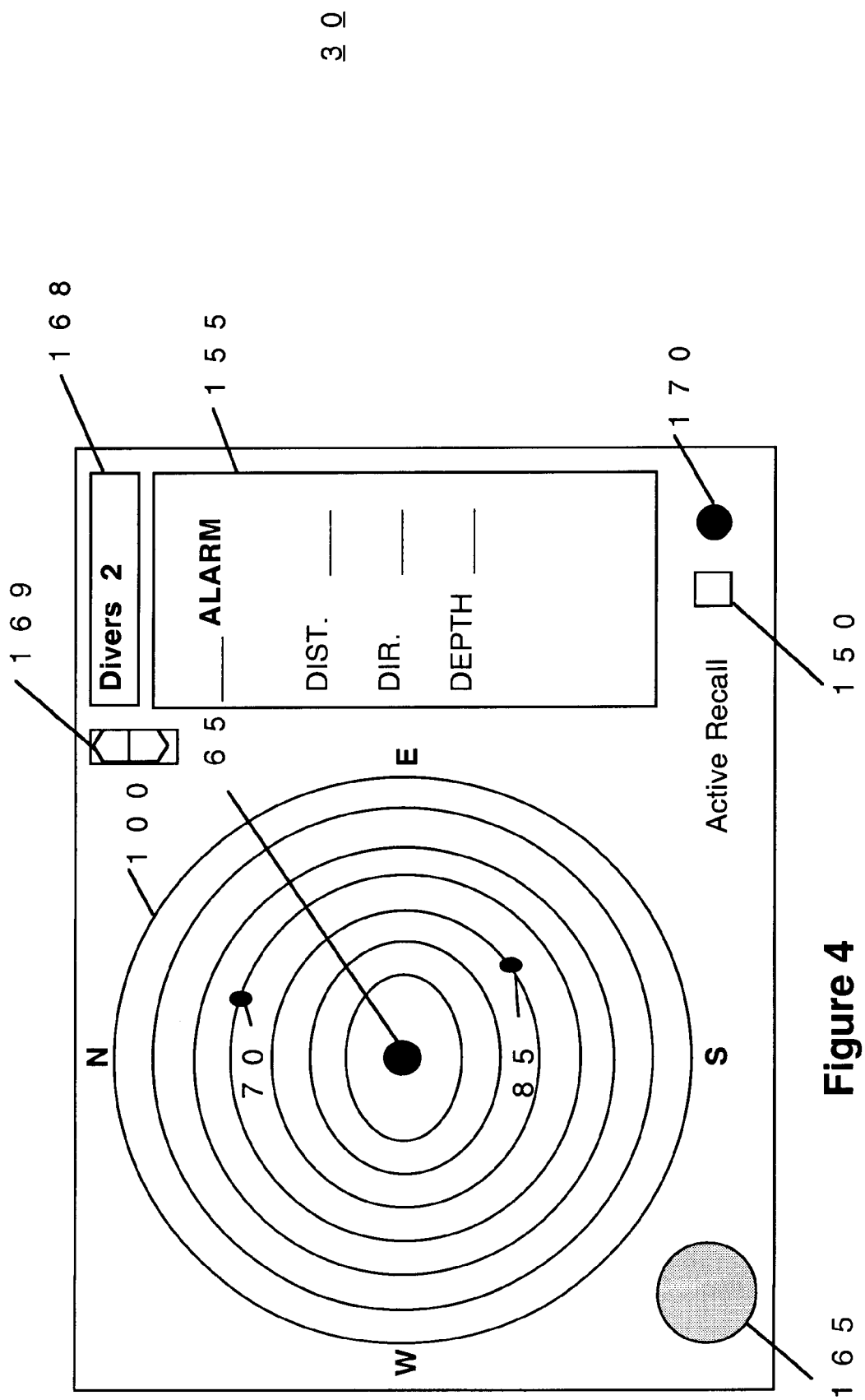
FIG. 4 is a detailed schematic of the surface station monitor according to the present invention.

Referring to FIG. 4, a surface station monitor 30 is illustrated in the passive monitor mode. The monitor as illustrated is depicting the tracking of all remote diver systems 70 & 85, based on the manual input of the number of divers to be monitored 168 by the surface personnel toggling the selector switch 169 (up to increase/down to decrease), relative to the position of the surface station 65 by means of concentric distance and compass direction indication markers 100 out from the surface station 65. The active recall display 150, alarm mode indicator 155, alarm signal indicator 165 and recall button 170 have also been indicated for future reference.

Figure 5:
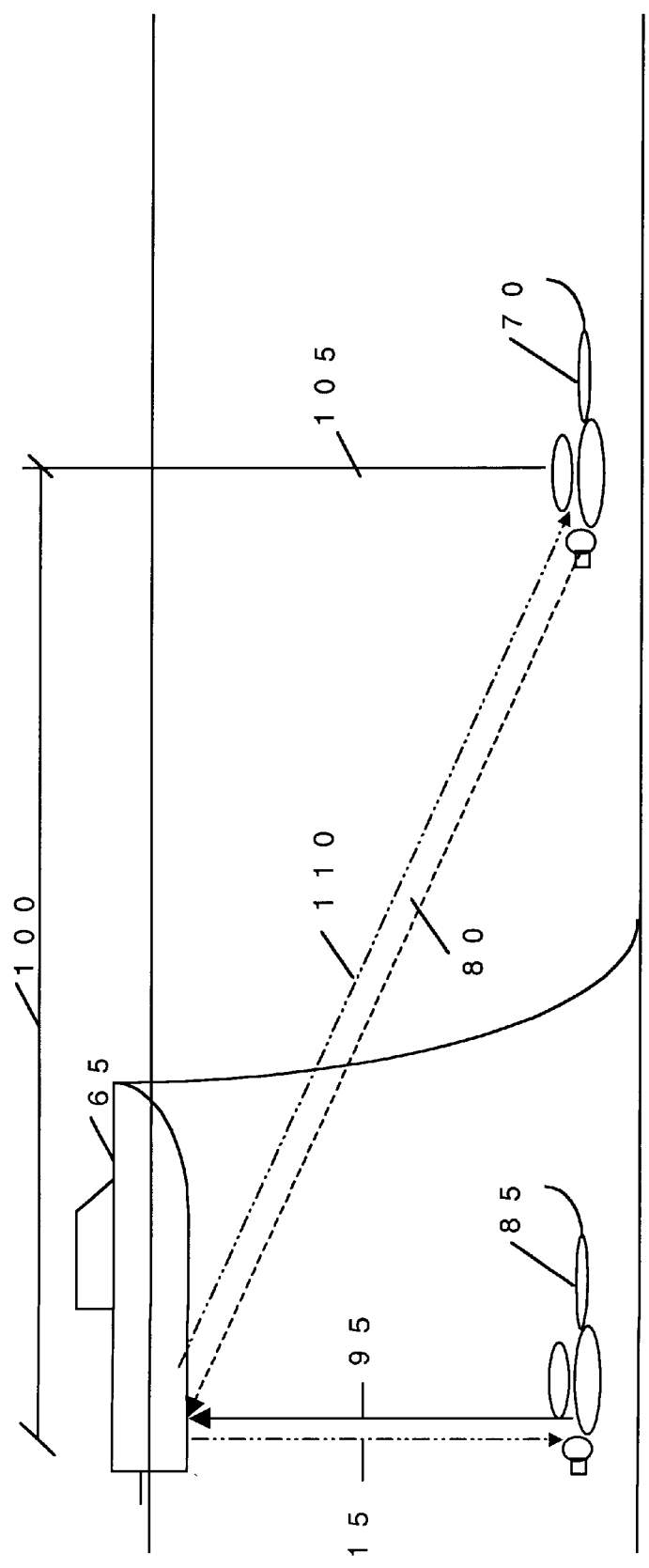
FIG. 5 illustrates how the system works in the active (recall) mode initiated from the surface station according to the present invention.

Referring to FIG. 5, the surface station 65 in the active general recall mode transmits recall response select frequency signals 110 & 115 in response to the remote diver systems 70 & 85 select frequency 80 & 95 transmissions respectively. This new recall response select frequency signal 110 & 115 triggers an alarm at the remote diver system 70 & 85 to alert the divers that it is time to return to the surface station 65 while generating the distance and direction 100 from the perspective of the diver 70 or 85 back to the surface station 65.

Figure 6:
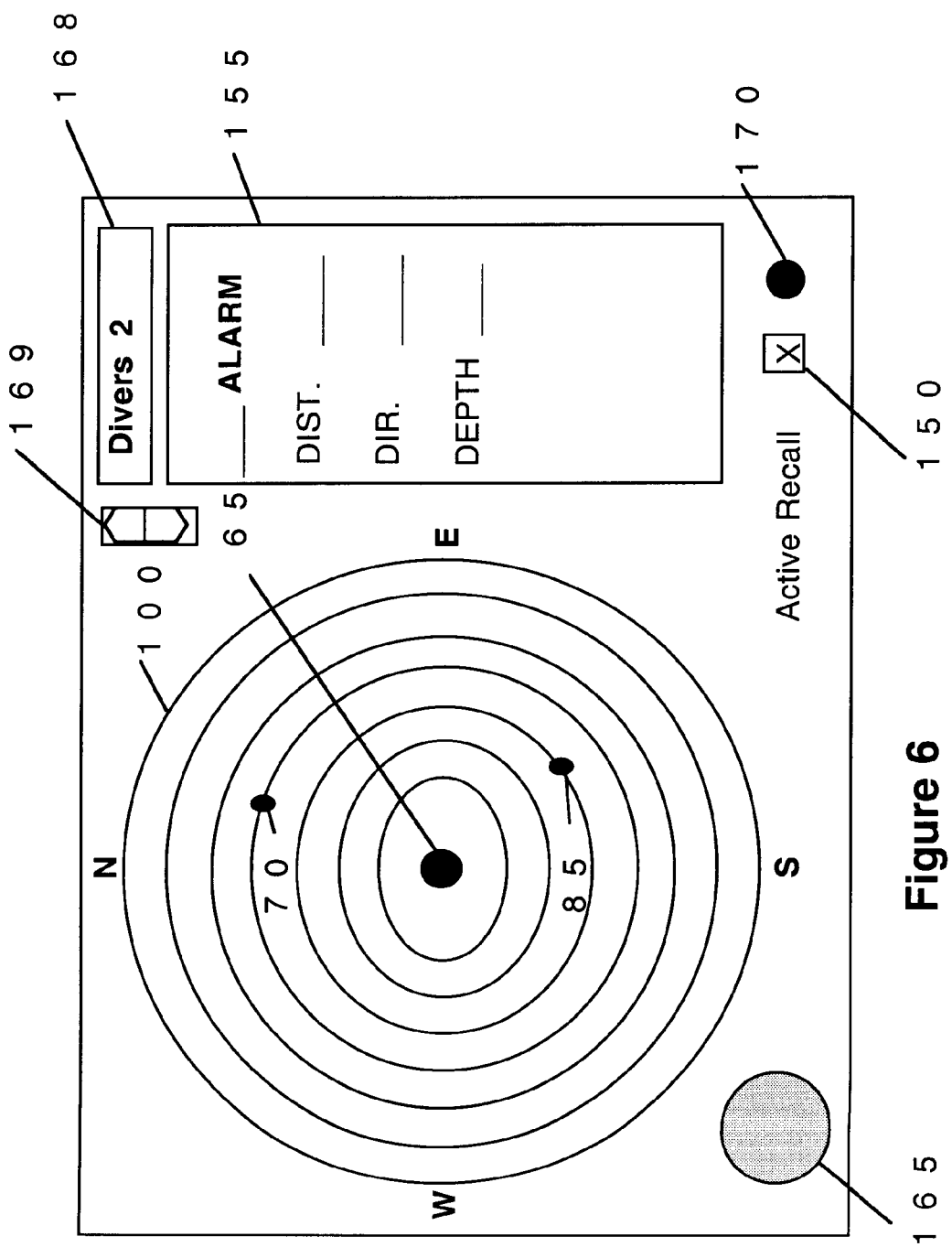
FIG. 6 is a detailed schematic of the surface station monitor in the active recall mode according to the present invention.

Referring to FIG. 6, the surface station monitor 30 is illustrated in the active recall mode 150 which is activated by depressing the recall button 170. The field of observation is defined by the distance/direction 100 relative to the surface station 65 position. The surface station monitor 30 graphically depicts the location of the remote diver systems 70 & 85 with respect to the distance/direction 100 from the perspective of the surface station. The audible alarm 165 and alarm mode 155 sections of the surface station monitor 30 have been indicated for future reference.

Figure 7:
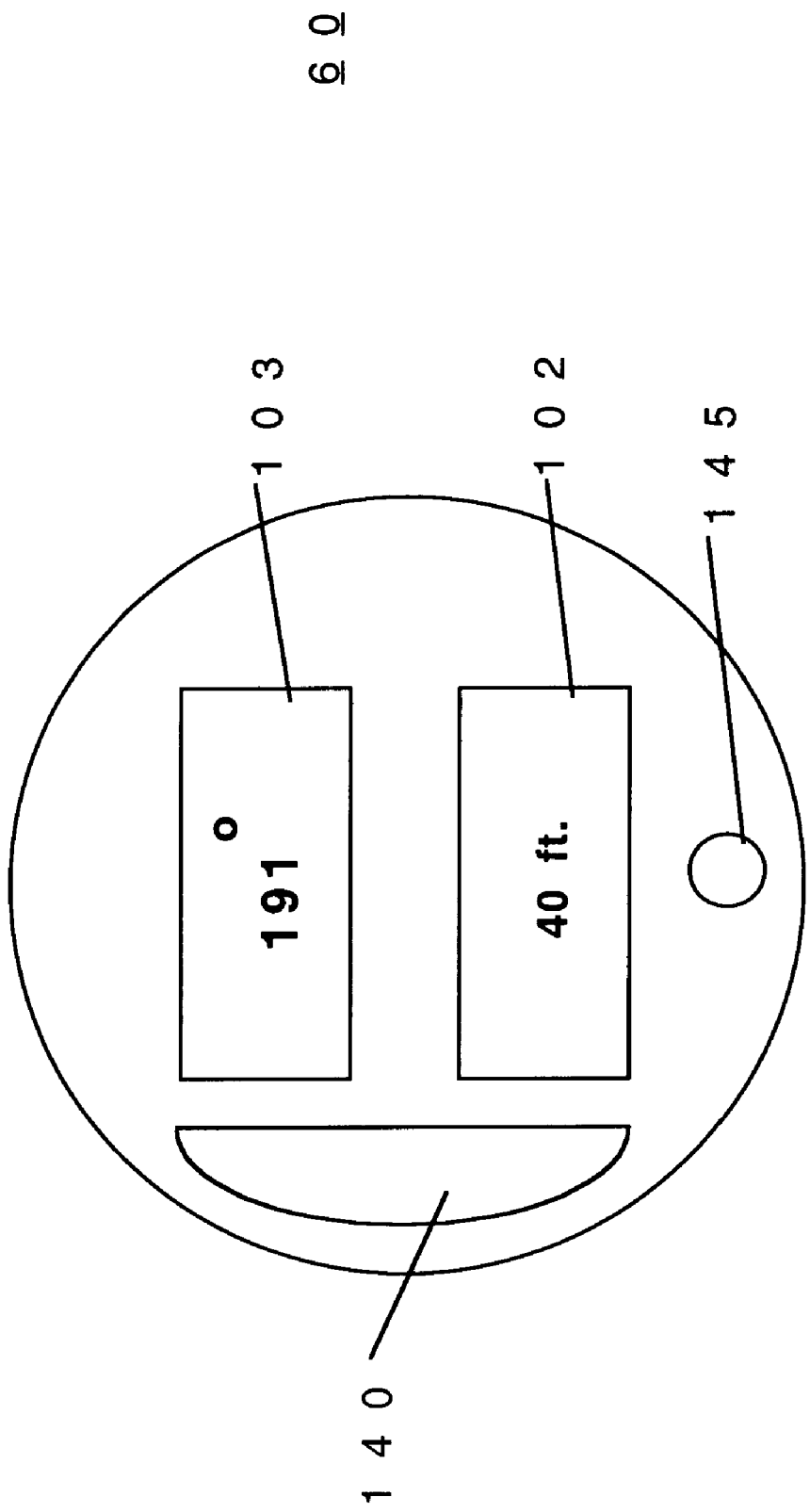
FIG. 7 is a detailed schematic of the diver's station monitor in the recall mode according to the present invention.

Referring to FIG. 7, a remote diver's system display 60 is illustrated indicating information, which has been, received via transmission of the select frequency and the response signal frequency return from the surface station. The remote diver's system illustrated is equipped with a display to indicate the direction 103 and distance 102 back to the surface station from the relative location of the remote diver system. An audible or mechanical alarm 140 is indicated for signaling the recall mode or alarm mode activation by the surface station, and an alarm activation button 145 is indicated for future reference for signaling an emergency situation from the remote diver system location to the surface station.

Figure 8:
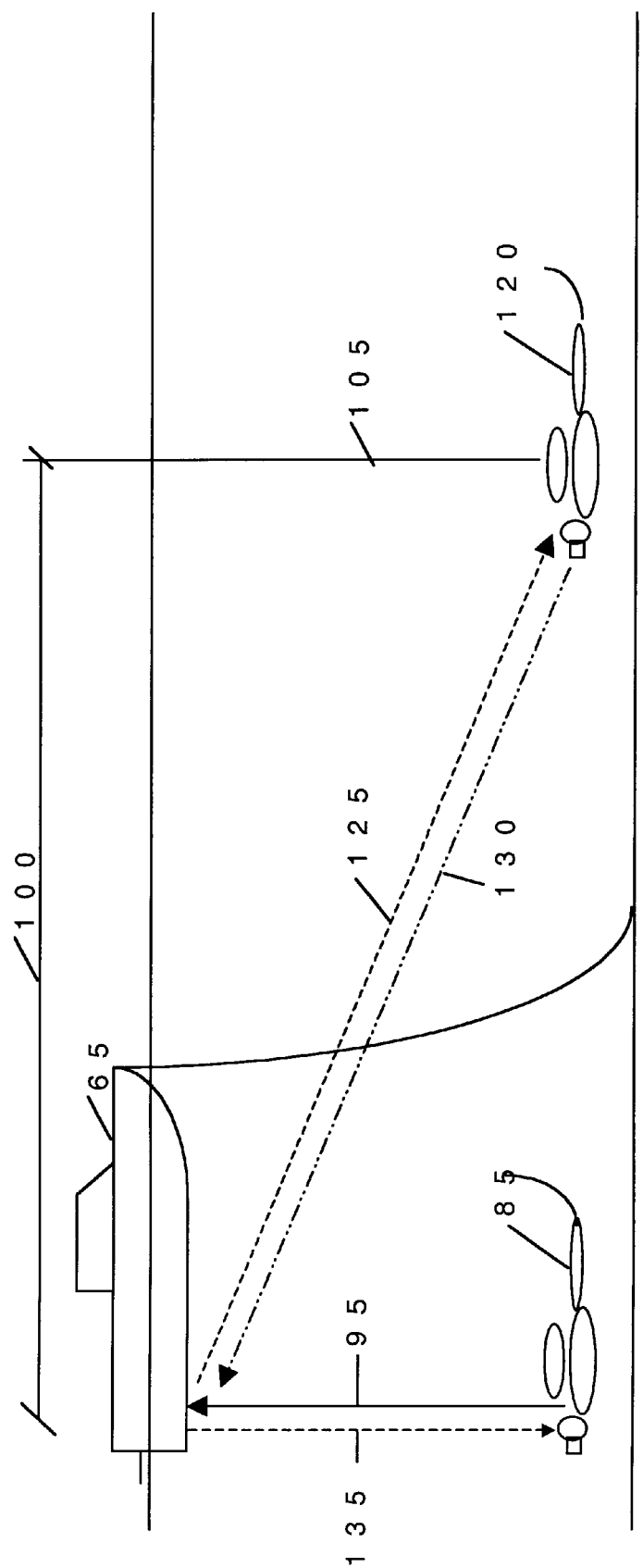
FIG. 8 illustrates how the system works in the active (alarm) mode transmitted from at least one diver according to the present invention.

Referring to FIG. 8, the active alarm mode has been initiated by remote diver system 120 transmitting an alarm select frequency 130 to the surface station 65 indicating that an emergency has occurred. The surface station 65 goes into the alarm mode selecting the appropriate alarm response signal frequency 125 & 135 for response to the select frequencies 130 & 95 from the remote diver systems 120 & 85 alerting them that an alarm was received, to stay at their respective locations until the surface station 65 can render assistance and return. The surface station monitor (FIG. 9) simultaneously displays the alarm mode 155 identifying that remote diver system 120 is in the alarm mode, giving distance/direction 100 and depth 105 in the alarm area of the monitor 30 relative to the surface station 65, while maintaining communications with the other remote diver system (s) 85.

Note: If a remote diver system alarm is activated all other remote diver systems, being communicated with and/or monitored, will indicate that an alarm response signal frequency return has been received by flashing the information being displayed at the remote diver system displays 60.

Figure 9:
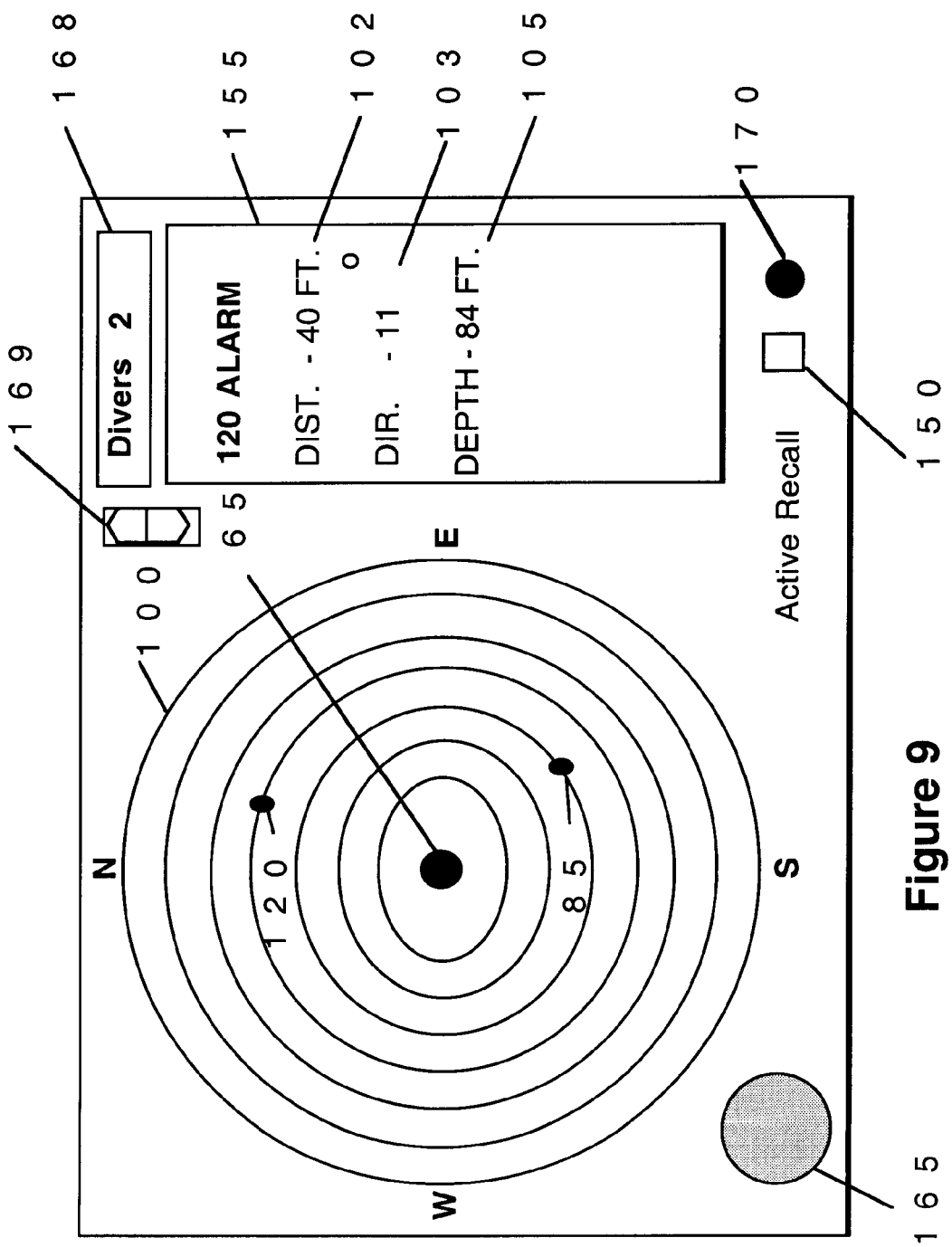
FIG. 9 is a detailed schematic of the surface monitor in the alarm mode according to the present invention.

Referring to FIG. 9, the surface station monitor 30 is illustrated in the active alarm mode, displaying information in the alarm mode area 155 of the monitor which has been activated by at least one diver 120 depressing the alarm activation button (145 from FIG. 7) at the remote diver system display 60. Activation of the alarm by at least one diver alerts the surface station 65 of an emergency situation by means of an audible or mechanical alert 165 and displays all pertinent information in the alarm monitor portion 155 of the surface station monitor 30 with regard to the location of the diver 120 in the alarm mode. This alarm select frequency (130, FIG. 8), when received, identifies an emergency situation for the surface station 65 and automatically causes the surface station to select the appropriate alarm response select frequency (135, FIG. 8) for all other divers.

Figure 10:
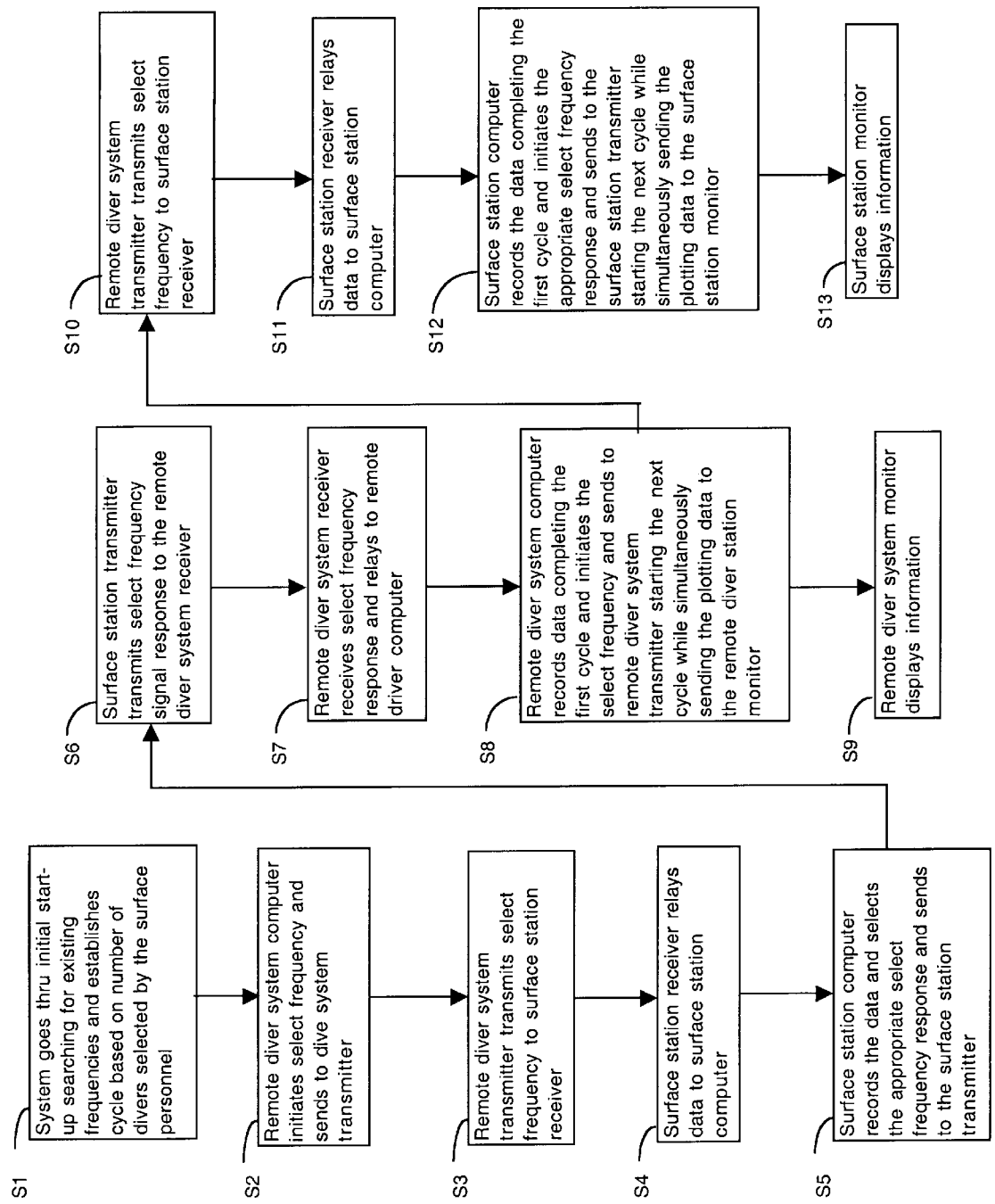
FIG. 10 is a system logic flow chart indicating the system in the passive mode and describing the method according to the present invention.

Referring to FIG. 10, system logic flow chart describes the system in the passive mode. Upon system start-up the system performs a random search for existing frequencies being received and stands by for the surface personnel to input the number of divers to be monitored and establishes a cycle rate in step one S1. At least one remote diver system computer initiates a select frequency and sends it to the diver transmitter in step two S2. The diver transmitter then transmits the select frequency to a surface station receiver in step three S3. The surface station receiver relays this information to the surface station computer in step four S4. The surface station computer records the data and generates the appropriate select frequency response and sends the select frequency response to the surface station transmitter in step five S5. The surface station transmitter transmits the select frequency response in step six S6 to the remote diver system receiver. The remote diver system receiver relays this information to the diver system computer in step seven S7. The remote diver system computer records the data and generates the original select frequency for transmission again to the surface station receiver completing one system cycle of information and starting the next, having received at least one complete cycles of information, the remote diver system computer simultaneously sends plotting data to the remote diver system monitor in step eight S8. The remote diver system monitor then displays the information received in step nine S9. The remote diver system transmitter the transmits the select frequency to the surface station receiver in step ten S10. The surface station receiver receives the signal and relays the data to the surface station computer in step eleven S11. The surface station computer records the data completing the first cycle of information and initiates the appropriate select frequency response to be sent to the surface station transmitter starting the next cycle while simultaneously sending plotting information to the surface station monitor in step twelve S12. The surface station monitor then displays the information in step thirteen S13.

Figure 11:
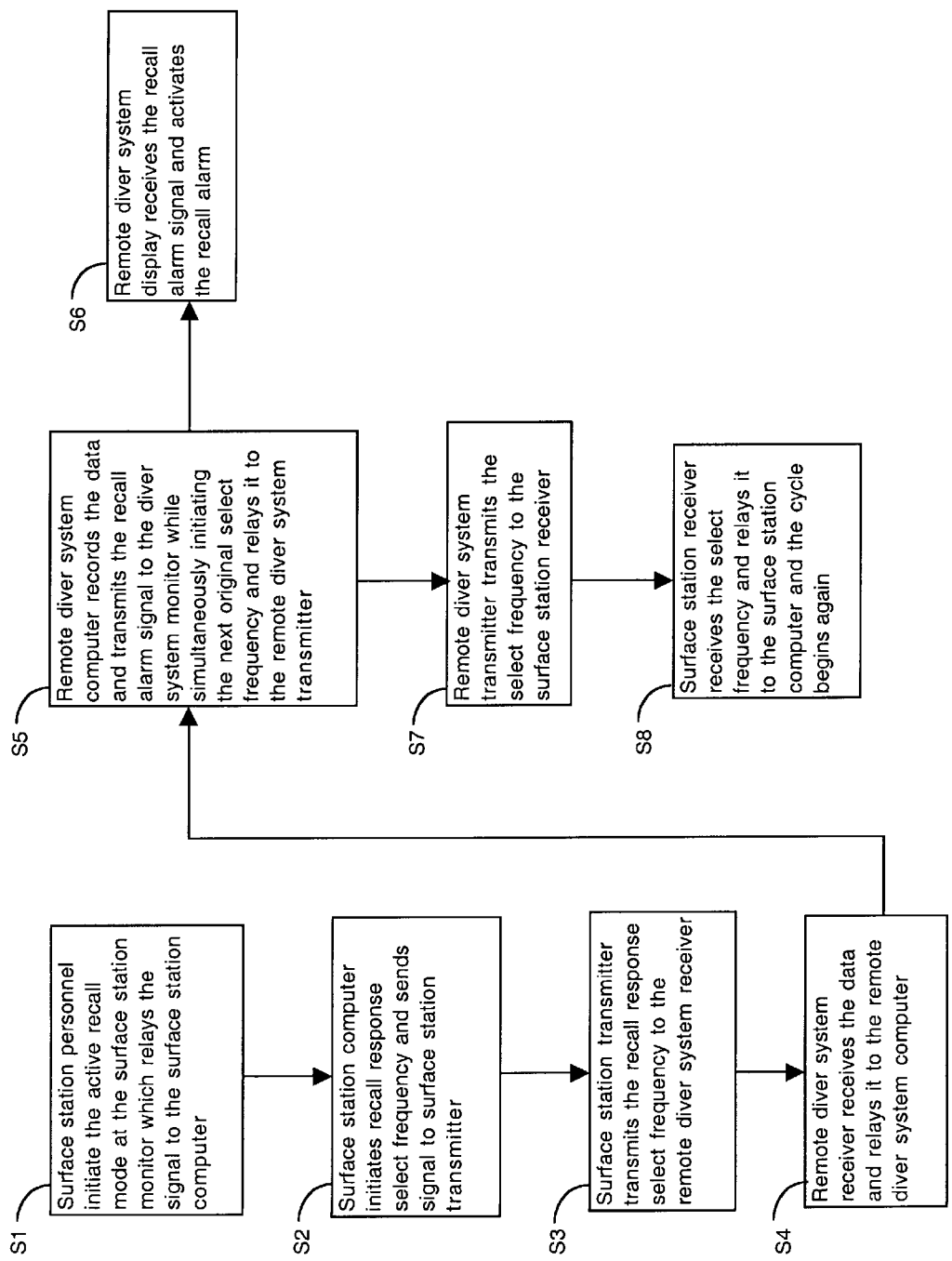
FIG. 11 is a system logic flow chart indicating the surface system in the active (recall) mode and describing the method according to the present invention.

Referring to FIG. 11, system logic flow chart describes the system in the active recall mode. The surface station personnel initiate the active recall mode at the surface station monitor 30 (see FIG. 8, recall button 170, active recall 150)

which relays the signal to the surface station computer in step one S1. The surface station computer initiates the recall response select frequency to be used for return signals to at least one remote diver system select signal frequency and relays the recall response select frequency to the surface station transmitter in step two S2. The surface station transmitter then transmits the recall response signal frequency to the remote diver system receiver instep three S-3. The remote diver system receiver receives the signal and relays the data to the remote diver system computer in step four S4. The remote diver system computer initiates the recall alarm to the remote diver system monitor while simultaneously initiating the next original select frequency and relays the signal to the remote diver system transmitter in step five S5. The remote diver system display receives the recall alarm signal and activates the recall alarm in step six S6. The remote diver system transmitter transmits the select frequency to the surface station receiver in step seven S7. The surface station receiver receives the select frequency and relays the signal to the surface station computer to complete the cycle of data and begin the next cycle in step eight S8.

Figure 12:
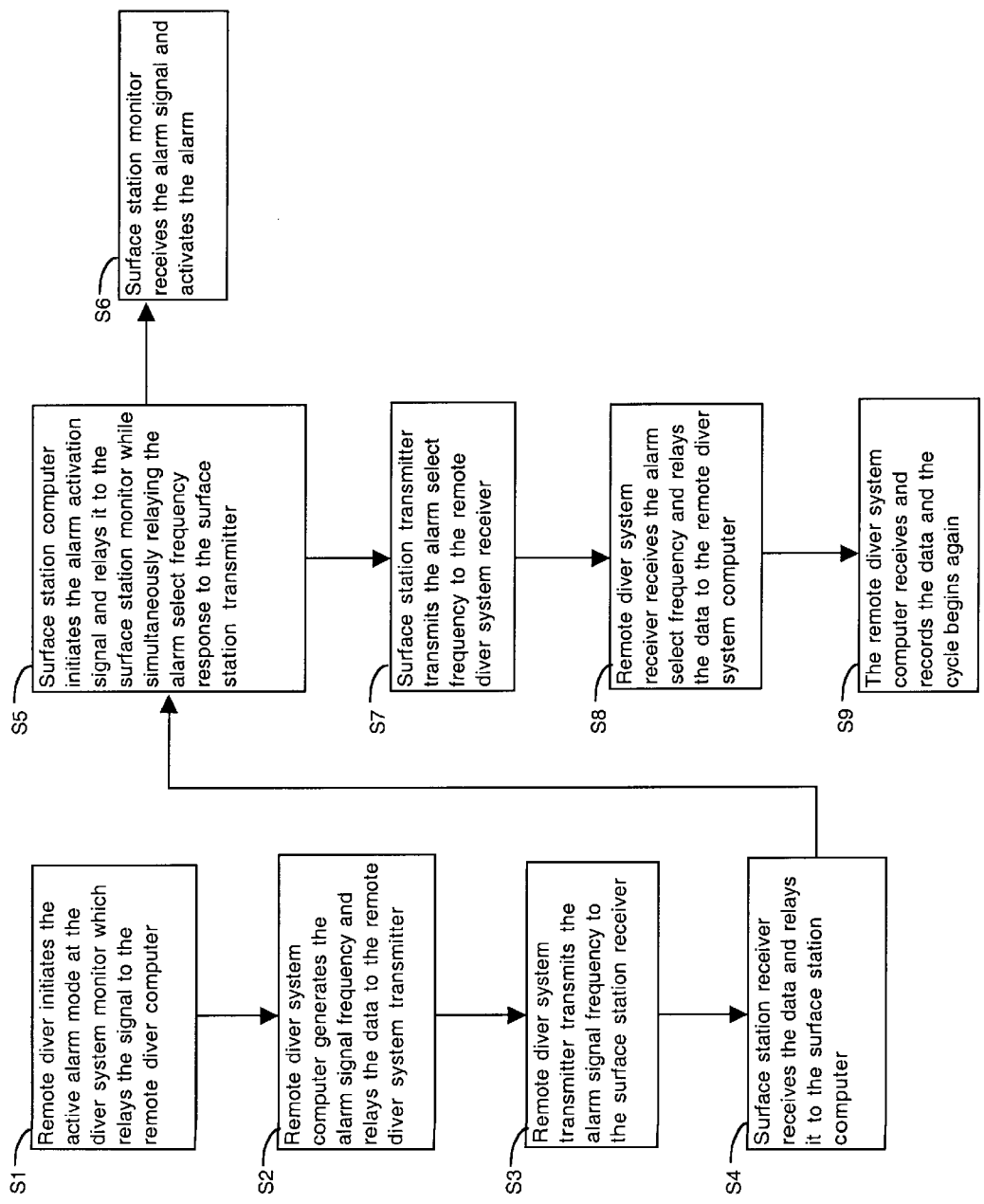
FIG. 12 is a system logic flow chart indicating at least one diver system in the active (alarm) mode and describing the method according to the present invention.

Referring to FIG. 12, system logic flow chart describes the system in the active alarm mode initiated by at least one remote diver system. A diver initiates the active alarm mode at the remote diver system display 60 (see FIG. 6, alarm button 145) which relays the signal to the diver system computer in step one S1. The remote diver system computer generates the alarm signal frequency to be used inlieu of the original select signal frequency and relays the data to the remote diver system transmitter in step two S2. The remote diver system transmitter transmits the alarm signal frequency to the surface station receiver in step three S3. The surface station receiver receives the signal and relays the data to the surface station computer in step four S4. The surface station computer initiates the alarm activation signal and relays the signal to the surface station monitor while simultaneously sending the alarm select frequency response to the surface station transmitter in step five S5. The surface station monitor receives the alarm signal and activates the alarm monitor and alarm signal (see FIG. 9, 155 and 165) in step six S6. The surface station transmitter transmits the alarm select frequency to the remote diver system receiver in step seven S7. The remote diver system receiver receives the alarm select frequency and relays the data to the remote diver computer in step eight S8. The remote diver system computer receives and records the data in step nine S9 and the cycle begins again.

Note: All other remote diver systems participating will receive the appropriate alarm select signal frequency in response to their normal select frequency transmission.

The present invention may be implemented using conventional general purpose sonar frequencies and digital computers or microprocessors programmed according to the teachings of the present specification, as will be apparent to those skilled in the computer and sonar art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be apparent to those skilled in the art.

Although the present invention is described in terms of a single system operating, the system will automatically search for like systems operating in the area and preprogram for frequencies for proper operation accordingly.

Although the preferred embodiment of the present invention is described in terms of conventional select frequencies and select frequency responses, the present invention could be adapted to utilize alternative select radio frequencies, select sonar frequencies, coding of pulses, pulse intensity arrangements, etc. to enhance the level of communication possible by simply modifying the hardware and/or software as would be apparent to those skilled in the arts of sonar, computers, and the communication arts.

Although the preferred embodiment of the present invention is described in terms of a surface station transmitter, a surface station computer, a surface station receiver, surface station monitor and at least one remote diver system made up of a diver system transmitter, a diver system computer, a diver system receiver, and a diver system monitor, the present invention could be adapted for use with generic sonar equipment, transducers/receivers, etc. simply by modifying the hardware and/or software, as will be apparent to those skilled in the art.

Although the preferred embodiment of activating the active recall mode is described in terms of pressing the recall button, the present invention could be adapted to use with timers, remote personal dive computer equipment, etc. as will be apparent to those skilled in the electronic arts.

Although the preferred embodiment of the surface station and remote diver system are described in terms of a single operating system the present invention could be programmed to receive diver alarm select frequencies by any system within range.

Although the preferred embodiment of the surface station and remote diver system are described in terms of at least one remote diver system and at least one surface station the present invention could be adapted to interface to other various types of personal computers, work stations, etc. by simply modifying the surface station computer and the remote diver system computer, as ill be apparent to those skilled in computer art.

Although the preferred embodiment of the present invention is described in terms of surface station monitor and at least one remote diver system display, the system monitoring displays could be replaced by other equipment as will be apparent to those skilled in the electronic arts.

The present invention includes a computer generated program and network product, for implementing the process of the present invention (e.g., as shown in FIGS. 10, 11, and 12) to monitor and address the problem of recalling at least one diver and initiating emergency alarms of at least one diver at depth. However, this invention may be implemented by the preparation of application specific integrated circuits or by interconnecting an appropriate network of conventional component circuits in conjunction with existing sonar systems or radio wave systems, as will be readily apparent to those skilled in the electronic arts.

The method and system of the present invention is reliable because it eliminates human error, it is easy to implement because it utilizes basic elementary equipment, it is simple because the operators are only monitoring the equipment for alarm or recall functions, it is reliable because the audible and/or mechanical alarms alert the user of any change in status without relying on the participants visual concentration.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for determining the geographic relationship between at least one diver and a surface station, comprising the steps of
   - initiating and transmitting passive cycle or active alarm/recall select signal frequencies from at least one diver system to a surface station,
   - receiving passive cycle or active alarm/recall select signal frequencies from at least one diver at the surface station,
   - recording the data collected and issuing the appropriate active alarm/recall or passive cycle select response signal frequency and calculating the distance and direction to the diver system based on the cycle time and initiated direction,
   - displaying the data collected at the surface station,
   - transmitting the appropriate active alarm/recall or passive cycle select response signal frequency from the surface station to at least one diver,
   - receiving the active alarm/recall or passive cycle select response signal frequency from the surface station at the diver(s),
   - recording the data collected, initiating the next active alarm/recall or passive cycle select signal frequency and calculating the distance and direction to the surface station based on the cycle time and initiated response direction, and
   - displaying the data collected at the diver station.

2. The method according to claim 1, further comprising the steps of:
   - initiating a mechanical signal alert from the surface station to at least one diver indicating the end of the dive while supplying data on distance and direction back to the surface station for extraction; and
   - initiating a mechanical signal from at least one diver to the surface station indicating that closer observation and/or action is required while supplying data to the surface station on distance and direction to the diver(s).

3. The method according to claim 1, further comprises of the steps of:
   - issuing the alert by means of an audible, vibration, or visual signal to at least one diver, or the surface station, giving a compass direction and distance to the surface station, or at least one diver.

4. The method according to claim 1, wherein the step of calculating the distance and direction comprises the steps of:
   - transmitting a passive cycle select signal frequency from at least one diver system to the surface station which interprets the select signal frequency, records the data, and returns a select response signal frequency to at least one diver creating a cycle which visually plots the relationship between the diver and the surface station; and
   - initiating an active alarm/recall recall select signal frequency response from the surface station to at least one diver which is received by the diver system(s) and in turn initiates an alert signal at the diver system(s); and
   - initiating an active alarm/recall alarm select signal frequency from at least one diver to the surface station which in turn calculates the distance, direction, and depth of the diver initiating the alarm signal at the surface station.

5. The method according to claim 1, wherein the steps of determining the distance and direction to either the surface station or at least one diver are performed via active alarm/recall and passive cycle sonar or select signal frequency and select signal frequency response pulses interrupted via computer.

6. A system for determining geographic relationship between the surface station and at least one diver, comprising:
   - a first device for initiating and transmitting passive cycle or active alarm/recall select signal frequencies from at least one diver system to a surface station,
   - a second device for receiving passive cycle or active alarm/recall select signal frequencies from at least one diver at the surface station,
   - a third device for recording the data collected and issuing the appropriate active alarm/recall or passive cycle select response signal frequency and calculating the distance and direction to the diver system based on the cycle time and initiated direction,
   - a fourth device for displaying the data collected at the surface station with means for alerting with regard to the alarm mode,
   - a fifth device for transmitting the appropriate active alarm/recall or passive cycle select response signal frequency from the surface station to at least one diver,
   - a sixth device for receiving the active alarm/recall or passive cycle select response signal frequency from the surface station at the diver(s),
   - a seventh device for recording the data collected, initiating the next active alarm/recall or passive cycle select signal frequency and calculating the distance and direction to the surface station based on the cycle time and initiated response direction, and
   - an eighth device for displaying the data collected at the diver station and means for alerting with regard to the recall mode.

7. The system according to claim 6, wherein the third and seventh devices, initiate a passive cycle or active alarm/recall select signal frequency and select signal response frequency pulses which are received and returned in a cycle to supply data as to the distance and direction between at least one diver and surface station
   Note: Differences between active alarm/recall and passive cycle select signal frequency and select signal response frequency referred to herein are established by means of frequency wave length or intensity of pulses being transmitted and responded to either manually or automatically.

8. The system according to claim 6, wherein the third and seventh devices receive passive cycle select signal frequency from the diver system and select response signal frequency from the surface station necessary to indicate and update the distance and direction relationship between at least one diver system and the surface station, and
   - initiate an active alarm/recall select signal frequency and/or an active alarm/recall select response signal frequency continuously to activate an alarm at the diver system or the surface station.

9. The system according to claim 6, wherein the first, second, third, fifth, sixth, and seventh devices act in concert to initiate and receive passive cycle or active alarm/recall select signal frequency and select signal response frequency, and updates the distance and direction relationship based on the direction and time of cycle information for each select signal frequency and select signal response frequency, and visually plots the information on an LED screen, computer screen, sonar display, CRT display, TV screen or digital readout.

10. The system according to claim 2 and 3, wherein the fourth or eighth devices initiate an active alarm/recall select signal frequency or active alarm/recall select signal response frequency pulse activating an alert signal to the surface station or at least one diver.

11. The system according to claim 10, wherein the third and seventh devices receive data input from the surface station and at least one diver necessary to initiate an alert to the surface station monitor and at least one diver system display, and reports to the surface station or at least one diver on initial distance and direction to the surface station or at least one diver, and updates the surface station or at least one diver on progress giving the new distance and direction until the two merge, and reports to all other divers that an alarm situation may be in progress.

12. The system according to claim 6, wherein the third and seventh devices comprises a select signal frequency and select signal response frequency receiving computer.

13. A computer program product comprising a computer storage medium having a computer program mechanism embedded in the computer storage medium for causing a computer to determine the distance and direction relationship between the surface station and at least one diver based on the cycle time and direction of frequencies, the computer program code mechanism comprises:

a first code device to receive select frequencies and/or respond with select response frequencies, a second code device to determine the distance/direction and depth relationship between the devices based on the cycle time of information, a third code device to initiate an alert or alarm mode and initiate the appropriate select signal frequency or select response signal frequency and initiate the corresponding alert or alarm mode, a fourth code device to determine if the system is in the alert or alarm, a fifth code device to monitor, display, and report on change in the relationship, and a sixth code device to record time and duration of events.

14. The computer program product according to claim 13, wherein the first, second, fifth and sixth code devices determine the distance/direction and depth relationship between the surface station and at least one diver based the frequencies, the computer product memory comprising:

fields which store select signal frequencies and select response signal frequencies, fields which store select signal responses for recall mode fields which store planned alert signal(s), fields which store select signal responses for alarm mode fields which store entry time of at least one diver fields which store planned return time of at least one diver, and fields which store time and duration of events.

15. The computer program product according to claim 13, wherein the code devices include a memory containing data structure for processing information relating to determining the distance/direction and depth between the surface station and the at least one diver, the memory comprising:

fields which store and plot select signal frequency and select signal response frequency cycle data to determine distance/direction and depth, and fields which store and plot progress data with respect to the cycle data, and fields which store and plot select signal frequency data and select signal response data on distance/direction and depth relationships between at least one diver and the surface station based on cycle time, and fields which store and plot emergency data on at least one diver in distress and select signal response frequencies to issue to all other diver systems.

16. The computer program product according to claim 13, wherein the code devices are further configured to issue plotting data at the surface station monitor or at least one diver station display.

17. The computer program product according to claim 13, wherein third and fourth code devices are further configured to issue an audible and/or visual alarm at the surface station or at least one diver.

18. The computer program product according to claim 13, wherein the fifth code device is further configured to issue updated plotting data at the surface station or at least one diver.

19. The computer program product according to claim 13, wherein the third code device is activated manually from the surface station monitor or at least one diver station initiating devices.

20. The computer program product according to claim 13, wherein the third code device can be activated automatically from the surface station based on fields which store the entry time and fields that store the planned return time of at least one diver.

21. The system according to claim 6, wherein the passive cycle select signal frequency from the third and seventh devices are monitored by the second device for signal strength to determine if the distance relationship exceeds a pre-programmed limit and automatically initiates a localized alert at both the offending third device and the seventh device to alert the surface station and the specific diver that the predetermined distance limit has been exceeded.

* * * * *